United States Patent [19]

Mellen

[11] Patent Number: 5,503,587
[45] Date of Patent: Apr. 2, 1996

[54] MULTI-BALL DROP TOY

[76] Inventor: Walter R. Mellen, 9 Sylvan Ave., Chelmsford, Mass. 01824

[21] Appl. No.: 344,022

[22] Filed: Nov. 23, 1994

[51] Int. Cl.⁶ .......................... A63H 33/00; A63H 29/00; G09B 23/08; A47H 1/10
[52] U.S. Cl. ........................ 446/486; 446/429; 248/318; 434/302
[58] Field of Search .................. 47/67; 211/14, 211/113, 117; 248/318, 317, 328, 493; 446/486, 487, 489, 490, 491, 168, 308, 309, 311, 429; 434/300, 302, 276, 291, 195; 273/414, 413

[56] References Cited

U.S. PATENT DOCUMENTS

| D. 222,949 | 2/1972 | Sounder | 47/67 X |
|---|---|---|---|
| 1,749,497 | 3/1930 | McGlashan | 47/67 X |
| 2,064,826 | 12/1936 | Gabriel | 248/318 X |
| 3,744,472 | 7/1973 | O'Ryan | |
| 3,854,242 | 12/1974 | Gladstein | 248/318 X |
| 4,121,720 | 10/1978 | Hayes | 211/113 |
| 4,181,234 | 1/1980 | Feighan | 47/67 X |
| 4,506,475 | 3/1985 | Elliott | 47/67 |
| 4,561,547 | 12/1985 | Estwanik, III | 211/14 |
| 4,630,795 | 12/1986 | Kagan | 47/67 X |
| 5,046,984 | 9/1991 | Cane . | |
| 5,094,462 | 3/1992 | Boyle et al. | 273/414 |
| 5,158,462 | 10/1992 | Hones et al. . | |
| 5,256,071 | 10/1993 | Hones et al. . | |

FOREIGN PATENT DOCUMENTS

| 207068 | 1/1921 | Canada | 211/113 |
|---|---|---|---|
| 607482 | 7/1926 | France | 47/67 |

Primary Examiner—Robert A. Hafer
Assistant Examiner—D. Neal Muir
Attorney, Agent, or Firm—Don Halgren

[57] ABSTRACT

A multi-ball drop toy assembly comprising a flexible harness for holding elastically deformable balls in a vertical, spaced-apart array, which when dropped, permits the uppermost ball of the array, to escape the harness after collision with its adjacent ball.

13 Claims, 3 Drawing Sheets

MULTI-BALL DROP TOY

BACKGROUND OF THE INVENTION

1. Field of the Invention

This invention relates to scientific toys, and more particularly to a dropable multi-ball vertical collision ball launcher.

2. Prior Art

Impact ball toys have been developed to the enjoyment of generations of children. A common such toy is shown in U.S. Pat. No. 5,158,462 to Hones et al. This toy utilizes solid steel balls, each on a tether, and each of a different mass. Rocking and impact from the heaviest ball to the lightest ball transfers energy and momentum to the lightest ball on the end of the series causing it to swing higher and faster than its neighbors.

Another toy in this area is shown in U.S. Pat. No. 5,046,984 as a bouncing ball launcher comprising an open topped rigid tube. A plurality of balls with equal diameters, but of different masses is dropped in the tube from the top of the tube. The top ball, after the lowest ball bounces on the bottom of the tube and the other balls collide with each other, bounces to a much higher level than that from which it was dropped.

U.S. Pat. No. 5,256,071 to Hones et al discloses a multiple collision ball accelerator where a plurality of different sized balls is arranged in a column as in U.S. Pat. No. 5,046,984, but on a rigid guide pin. The largest, most massive, and lowest ball is fixedly attached to the base at the guide pin. The remaining solid balls have diametric bores therethrough for slidable receipt of the guide pin for a multi-ball drop toy arrangement.

U.S. Pat. No. 3,744,472 to O'Ryan shows a series of balls of decreasing size in a vertical array, the largest on the bottom and the smallest at the top, each ball having a socket at its top to receive the ball above. Imparting an upward blow to the bottom ball causes the smallest ball to depart upward with substantial velocity.

All of the prior art devices disclose sockets at contact points, rigid central pins or rigid tubes for vertically aligning the devices. They also require a set of balls with the same diameter, or require drilled holes in the balls for a central guide pin, or require deformations of the balls at their points of contact.

It is an object of the present invention to increase the number and type of balls that may be utilized in this arrangement, including soft, multisize, hollow, and inflatable balls.

It is a further object of the present invention to provide a means of separating the balls from each other initially, to obtain a condition for maximum rebound. Soft elastic balls need a separation for maximum rebound.

It is yet a further object of the present invention to provide a support that permits only minimum interference with the rebounding balls, especially the top ball.

A still further object of the present invention is to provide a ball drop arrangement which permits easy measurements to verify basic energy and momentum equations.

BRIEF SUMMARY OF THE INVENTION

The present invention comprises a flexible alignment arrangement for a multi-ball drop toy assembly.

The multi-ball drop toy assembly includes a plurality of multi-size elastically deformable balls, in a vertical array. The assembly may include a first large diameter ball, (e.g. about 5–6 cm. diameter), a second ball disposed above the first ball with a smaller diameter than the first ball (e.g. about 3.9 cm. diameter), a third ball disposed above the second ball, with a smaller diameter than the second ball (e.g. about 2.7 cm. diameter). A fourth ball, of smaller diameter (e.g. about 1.6 cm. diameter) may comprise the uppermost end of the assembly. Each ball has an equator or imaginary horizontal plane which by definition, bisects the balls at a horizontal periphery.

A plurality of flexible restraints are arranged to hold the multiple elastically deformable, bouncable balls in their vertical array. The flexible restraints may be comprised of a harness of threads, strings, thin chains or thin flexible wires. The largest and lowermost first ball has the lower part of the restraint extending below its equator, but not at its lowermost pole.

The lowest part of the restraint may be anchored to the lowest (largest) ball by engagement with a plurality of spaced apart deposits of gelatinous adhesive. The restraint anchors are equiangularly spaced on the ball; and may be comprised of an elongated slot or the like in which the thread-like restraint may lie and secure itself therein. It is preferred that there be at least three vertically arranged restraint threads or strings, extending upward alongside the vertical array of elastically deformable balls, to form a floppy, flexible cage in which to hold the balls in temporary alignment during initial dropping thereof.

The threads extend upward in a generally cone shaped pattern, to an uppermost junction, such as a knot with thread and a loop above it for gripping and for putting the assembly on a hook.

An annular support ring of stiff thread, rubber, plastic or the like may encircle the lowest largest ball below its equator to act as the lowermost anchor for the vertically arranged restraints.

A first annular support ring, made of thin relatively stiff thread, rubber, plastic, wire or the like, may encircle and be secured to the flexible restraint threads above the large first ball, but yet is disposed beneath the horizontal equator of the second ball. The first annular support ring has a smaller diameter than either ball above or below it, and supports the second ball a short distance (e.g. 0.5 cm) above the first ball.

A second annular support ring similar to the above described first annular support ring, may engage the flexible restraint threads above the second ball, yet is beneath the horizontal equator of the ball above it, such as the third ball. The second annular support ring has a smaller diameter than either ball above or below it, and supports the third ball above the second ball by a short (e.g. 0.5 cm) distance.

In the embodiment in which there are additional vertically arrayed balls in an assembly, there are yet additional annular support rings disposed between the third and fourth balls and subsequent balls, in a manner similar to the aforementioned annular support rings.

The uppermost ball in the assembly, in this case, a fourth ball, of decreasing mass and diameter than those below it, has no annular support ring above it. Instead, it has merely the junction and hanging loop of the thin vertically arranged flexible threads together at a location about the distance above the uppermost ball, as would equal twice the length of the vertical height of the balls in the array. Thus, each support ring acts to hold the vertical array of thread-like restraints apart in a spaced array, to comprise a flexible cage-like structure which will fall off the array of balls except the lowermost ball, once the balls are raised above a horizontal, surface and dropped onto that "bounce" surface.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
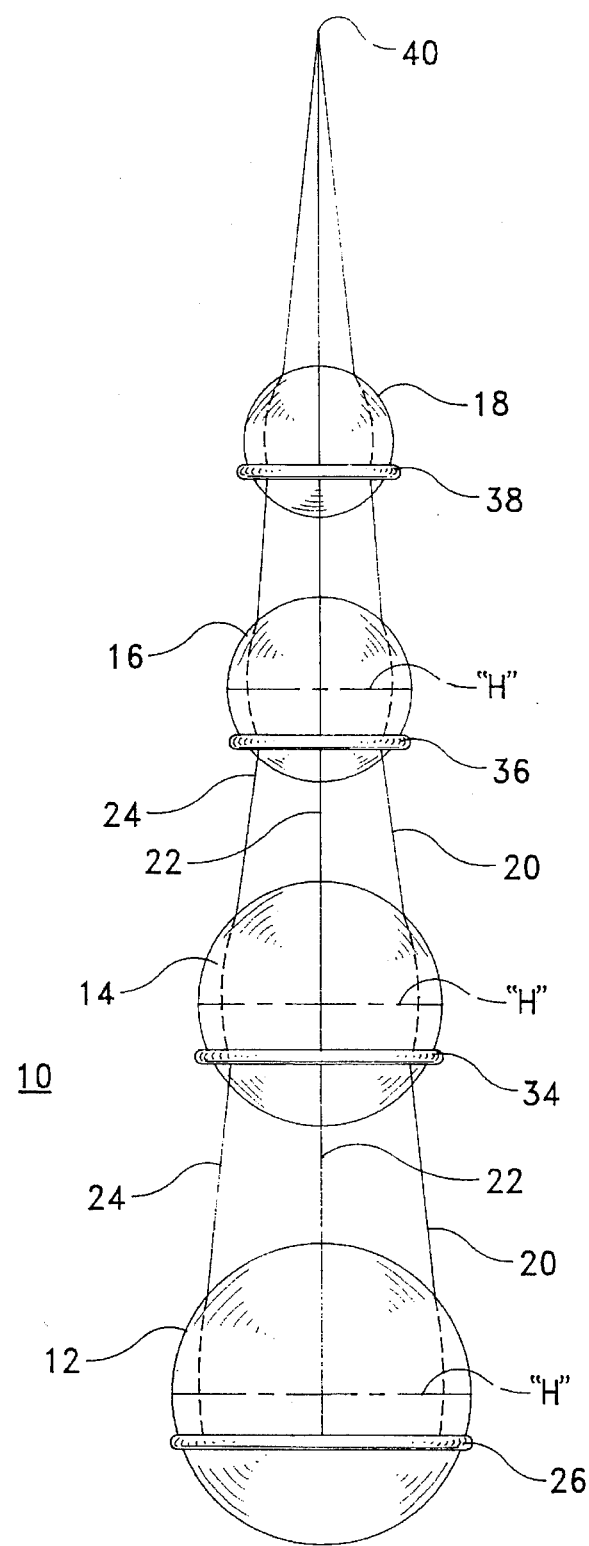
FIG. 1 is a side elevational view of one embodiment of thread anchors of the present invention.

The present invention comprises a flexible alignment arrangement for a multi-ball drop toy assembly 10.

The multi-ball drop toy assembly 10 includes a plurality of multi-size elastically deformable balls, in a vertical array. The assembly 10 may include a first large diameter ball 12, (e.g. about 5.6 cm. diameter), a second ball 14 disposed above the first ball 12, with a diameter smaller than the first ball 12 (e.g. about 3.9 cm. diameter), a third ball 16 disposed above the second ball 14, with a smaller diameter than the second ball 14 (e.g. about 2.7 cm. diameter). A fourth ball 18, of smaller diameter (e.g. about 1.6 cm. diameter), than the third ball 16 may comprise the uppermost end of the assembly 10. Each ball has an equator or imaginary horizontal plane "H" which, by definition, bisects the balls 12, 14, 16 and 18 at their horizontal periphery.

A plurality of generally vertically arranged, flexible restraints 20, 22 and 24 are arranged to hold the multiple elastically deformable, bouncable balls 12, 14, 16 and 18, in their vertical array.

The flexible restraints 20, 22 and 24, may each be comprised of a harness of different color flexible elements. The largest and lowermost first ball 12 has a plurality of restraint anchors 30 (shown only in FIG. 1), which are attached to the surface of that ball 12, below its equator, but not at its lowermost pole "L".

The restraint anchors 30 are equi-angularly spaced on the ball 12, and may be comprised of a deposit of gelatinous adhesive, an elongated slot or the like, in which the thread-like restraints 20, 22 and 24 may lie and secure themselves therein. It is preferred that there be at least three restraint threads or strings, extending alongside the vertical array of elastically deformable balls, to form a floppy, flexible cage in which to hold the balls in temporary alignment during initial dropping thereof. In another embodiment, not shown, six vertical threads may be arranged around the balls.

Figure 1A:
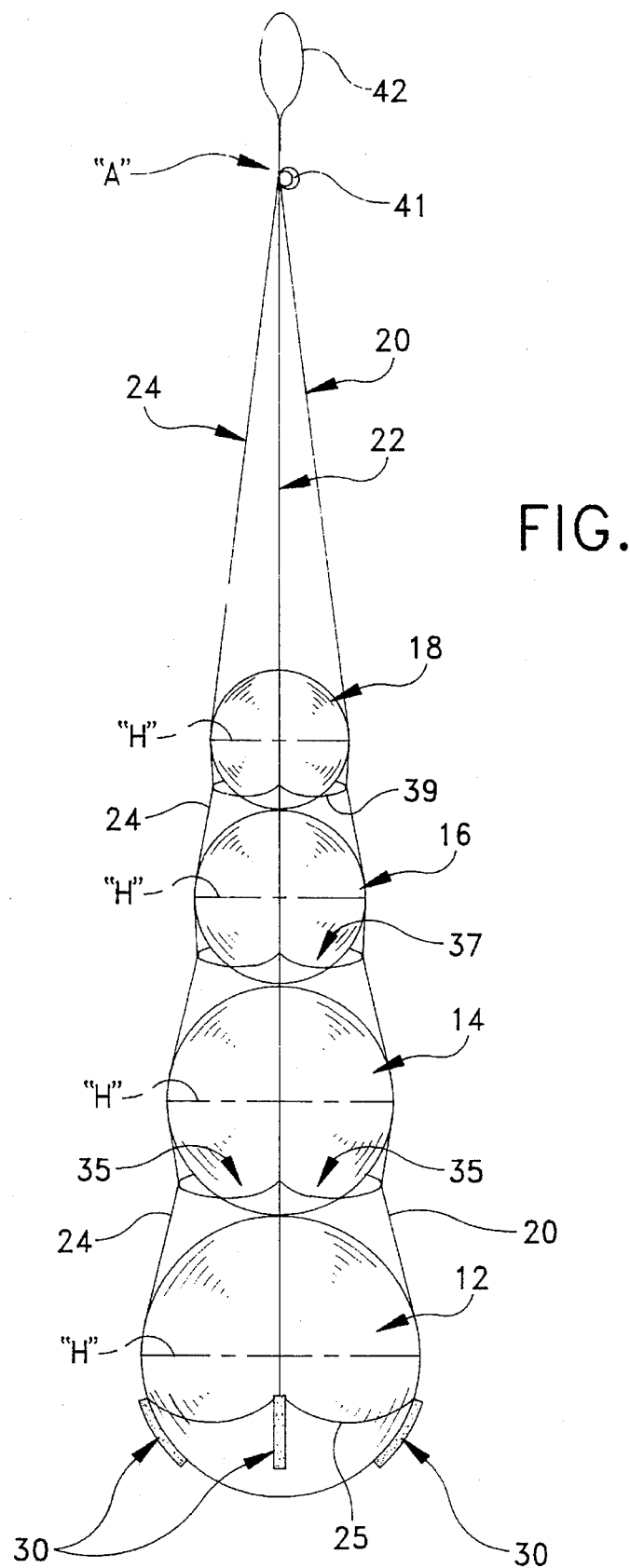
FIG. 1A is a side elevational view of a further embodiment of thread anchors of the present invention.

The threads (restraints 20, 22 and 24) extend in a generally cone shaped pattern, as shown in FIG. 1a, to an uppermost point "A", such as a knot with a loop above the knot for attaching the device onto a hook, or for a minimal gripping arrangement or the like.

In one preferred embodiment as shown in FIG. 1, an annular support ring 26, made from stiff thread, rubber, plastic, wire or the like, may be arranged to encircle the largest ball 12 below its equator H, and the restraints 20, 22 and 24 may have their lower ends attached therearound at 120 degree spaced apart locations on that ring 26.

A first annular support ring 34, made of stiff thread, rubber, elongated plastic filament, wire or the like, encircles the flexible restraint threads 20, 22 and 24, above the large first ball 12, yet beneath the equator of the second ball 14. The first annular support ring 34 has a smaller diameter than either ball above or below it, and may support the second ball 14 over the first ball 12, by a small amount.

A second annular support ring 36, made in a manner similar to the first ring 34, only of smaller overall diameter, encircles the vertical flexible restraint threads above the second ball 14, yet beneath the equator of the ball above it, such as the third ball 16, and may be arranged to support the third ball 16 a small distance, for example, about 0.5 cm. over the second ball 14 below it. The second annular support ring 36 has a smaller diameter than either ball above or below it.

In the embodiment in which there are four vertically arrayed balls in an assembly 10, there is yet than a third annular support ring 38 disposed between the third and fourth balls 16 and 18 in a manner similar to the aforementioned annular support rings.

The uppermost ball in the assembly 10, in this case, a fourth ball 18, of decreasing mass and diameter than those below it, has no annular support ring above it. Instead, it has merely the junction 40 of the thin vertical threads joined together at a location, "A", with a knot 41 and a hanging loop 42 about the distance above the uppermost ball, as would equal twice the length of the vertical height of the balls in the array.

FIG. 1A, is similar to the embodiment shown in FIG. 1, except that the rings 26, 34, 36 and 38 are now shown as relatively stiff loops of threads 25, 35, 37 and 39 which are attached to the four vertical threads 20, 22 and 24 (one behind the other, thus not being shown), at vertically spaced apart locations to hold the respective balls 12, 14, 16 and 18 in place. The four vertical threads 20, 22 and 24 being held 90 degrees apart in circumferential alignment by those loops of threads 25, 35, 37 and 39 by friction, knots or adhesive at the contact points.

Thus, each support ring acts to hold the vertical array of thread like restraints apart in a spaced array, to comprise a flexible cage structure which will fall off of the array of balls, except perhaps the lowermost ball, once the balls are raised above and have been dropped onto a "bounce" surface, the harness-like restraint thereby permitting a maximum unrestrained rebound of the top ball. The threads above the top ball, being light, are easily pushed aside by the rebounding top ball.

Figure 2:
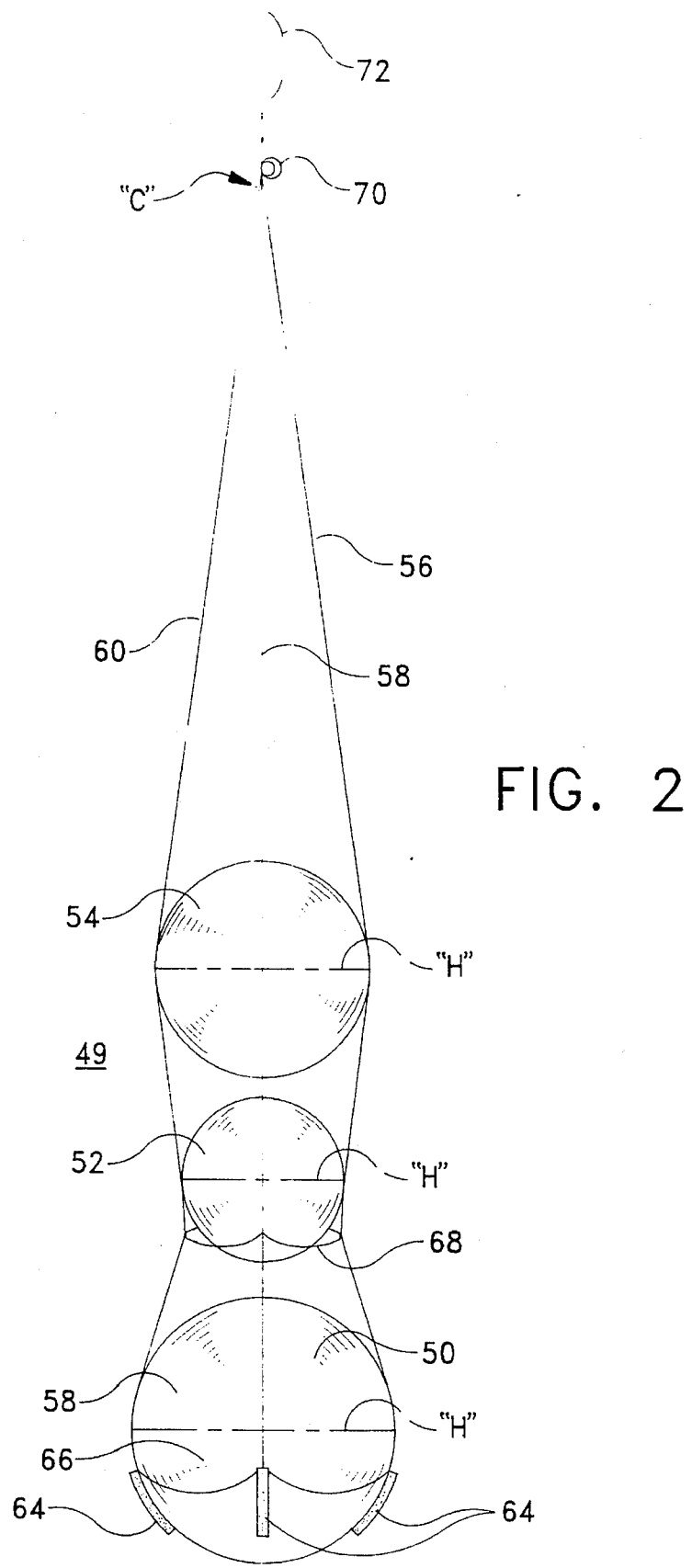
FIG. 2 is a side elevational view of a further embodiment of the present invention

FIG. 2 shows a further embodiment of a drop ball assembly 49 of the present invention, wherein a lowermost large ball 50 has a smaller diameter ball 52 disposed above it. A hollow third ball 54 is arranged above the small second ball 52, the third ball 54 being larger than the second ball 52, and smaller than the first ball 50. A plurality of four thin flexible vertically arranged restraints 56, 58 and 60 (one not shown because it is behind a front thread), are secured at their lowermost end to anchors 64 on the lower hemisphere 66 of the lowermost first ball 50. A thread securement ring 68 encircles each of the restraints 56, 58 and 60, and holds the second ball 52 in a spaced apart relationship from the first ball 50, while the vertically disposed restraints 56, 58 and 60, as long as they are in tension, hold the balls in vertical alignment. The restraints 56, 58 and 60 meet in a cone at a knot 70 with a loop 72 above the knot 70 which comprises the apex "C". The drop ball assembly 49 may be held at the apex "C", and when released, permits the balls 50, 52, and 54 to come into contact, once the tension in the restraints 56, 58 and 60 is slackened, to allow them to bounce and rebound, passing their energy to one another, but especially to the uppermost (preferrably hollow) ball 54.

In operation, the loop is placed over a hook with the vertical restraint threads hanging down to the lowest ball with a suitable number and properly sized support rings encircling the threads to support the vertically adjacent balls of diminishing diameter and mass. A ball is placed over each support ring, spacing the vertical restraints evenly circumferentially about each ball and ring, and separating each ball from the ball beneath it. The softer the balls are, the greater should be their separation. After the balls are aligned, the vertical restraint threads may need to be unwound from each other up to the knot. The system may be held by hand over a proper rigid, horizontal "bounce" surface by the loop over the knot, and then released. A long stretch of thread between the balls and the hand minimizes the effect of unwanted hand motion. For accurate measurements or to avoid error in any test of the energy transmission between the balls, the system may remain fastened to a hook and, at a point above the knot, the thread cut.

To avoid having to realign all the balls and rings after each drop, the restraint harness may be secured to the respective rings and lowermost balls, as by an adhesive, all except for the uppermost top ball. In that way, the top ball is free to escape the restraint and is free to rebound. The expected rebound height for a series of five elastic balls ranging from about 5.6 cm. in diameter to about 1.6 cm. in diameter, is about 20 times the dropped height, so that the height of any ceiling in which the assembly is dropped, should be noted and cared for. It is to be noted that the ball dimensions recited are exemplary only, and are not to be interpreted in a limiting sense.

Thus, what is shown is a unique flexible support for a multi-ball drop toy, which permits a vertical array of multi-type and multi-sized balls to be held with an optimum separation for a maximum rebound of the top ball and which support drops out of the way when the largest, lowermost ball strikes a horizontal surface, and the uppermost ball rebounds with the multiple energy of the lower and intermediately disposed balls.

I claim:

1. A multi ball drop toy assembly comprising:
    a plurality of elastically deformable balls, each ball having a horizontal equator and a center, at least two said balls of different mass, (the) each center(s) of each (equator) of said balls being held in a vertically aligned linear arrangement; and
    a flexible harness (for) of threads holding said plurality of elastically deformable balls in said vertically aligned (array) arrangement so that when said toy is dropped upon an underlying rigid surface, that ball which is uppermost is accelerated from said harness between said threads by multiple collisions within said arrangement.

2. A multi-ball drop toy assembly as recited in claim 1 wherein each of said deformable balls has a different mass and a different diameter from one another.

3. A multi-ball drop toy assembly as recited in claim 2 wherein one of said elastically deformable balls is larger than the other of said elastically deformable balls, said larger ball being disposed at a lowermost location in said flexible harness, at the bottom thereof.

4. A multi-ball drop toy assembly as recited in claim 3, wherein said threads comprising said harness each have a lowermost end which is secured to a lowermost hemisphere of the lowermost ball in said assembly.

5. A multi-ball drop toy assembly as recited in claim 4, wherein said lowermost ends are secured to said lowermost ball by an adhesive therebetween.

6. A multi-ball drop toy assembly as recited in claim 4, wherein said lowermost ends of said threads are spaced at equiangular locations below the equator of said lowermost ball.

7. A multi-ball drop toy assembly as recited in claim 6, wherein said lowermost ends of said threads are attached to equispaced locations of a ring, said ring being secured to the lower hemisphere of said lowermost ball.

8. A multi-ball drop toy assembly as recited in claim 6, wherein each of said elastically deformable balls in said assembly is supported at vertically spaced apart locations within said harness, by engagement with a ring, each of said rings being secured at vertically spaced apart locations on said harness.

9. A multi-ball drop toy assembly as recited in claim 6, wherein each of said elastically deformable balls in said assembly is supported at vertically spaced apart locations within said harness, by nesting within a stiff thread-like loop of material, each of said loops of material being secured at vertically spaced apart locations on said harness.

10. A multi-ball drop toy as recited in claim 1, wherein said vertically aligned balls are held in said vertically aligned arrangement spaced apart from one another by support means arranged in contact with said flexible harness.

11. A multi-ball drop toy assembly as recited in claim 1, wherein said balls range from about 5.6 cm. to about 1.6 cm. in diameter.

12. A multi-ball drop toy assembly as recited in claim 1, wherein at least one of said balls in said multi-ball drop toy assembly is larger in diameter than the ball beneath it.

13. A multi-ball drop toy assembly as recited in claim 1, wherein said harness comprises a plurality of vertical arranged threads arranged at 90 degree spaced apart locations on the horizontal equator of each of said balls in said assembly.

* * * * *